July 7, 1964　　　F. H. GINDROZ, JR　　　3,139,761
QUICK REVERSING MECHANISM
Filed July 31, 1962　　　　　　　　　　　　　4 Sheets-Sheet 1

INVENTOR
FRANK GINDROZ, JR.

BY　Scrivener & Parker
ATTORNEYS

July 7, 1964     F. H. GINDROZ, JR     3,139,761
QUICK REVERSING MECHANISM
Filed July 31, 1962     4 Sheets-Sheet 2
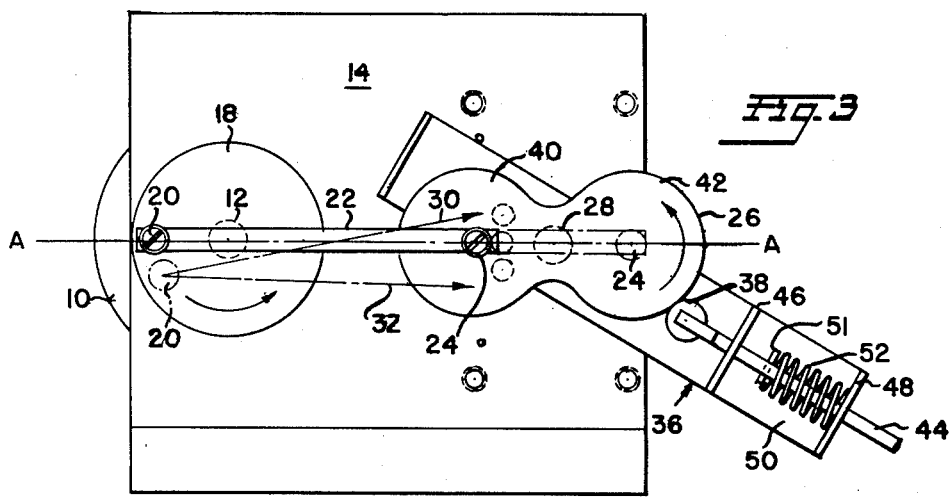
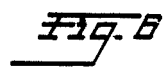
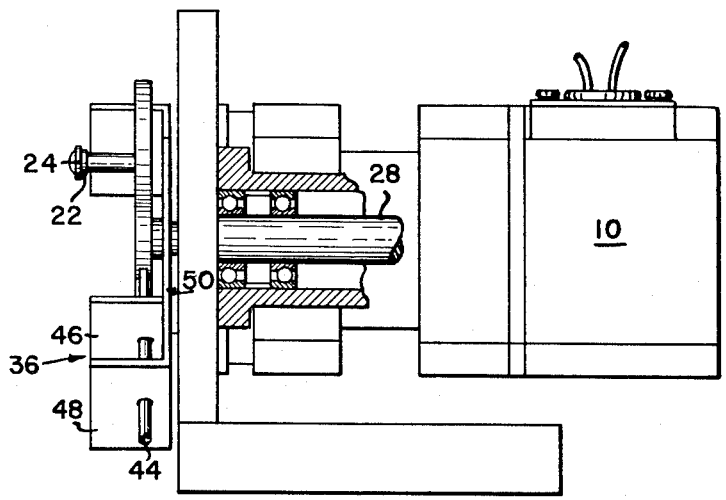
INVENTOR
FRANK GINDROZ, JR.
BY *Scrivener & Parker*
ATTORNEYS July 7, 1964 F. H. GINDROZ, JR 3,139,761
QUICK REVERSING MECHANISM
Filed July 31, 1962 4 Sheets-Sheet 4

INVENTOR
FRANK GINDROZ, JR.

BY *Scrivener & Parker*

ATTORNEYS

United States Patent Office 3,139,761
Patented July 7, 1964

3,139,761
QUICK REVERSING MECHANISM
Frank H. Gindroz, Jr., Torrance, Calif., assignor to Electronic Specialty Co., Los Angeles, Calif., a corporation of California
Filed July 31, 1962, Ser. No. 213,660
13 Claims. (Cl. 74—68)

This invention relates to mechanical movements and, more particularly, to improved means for rapidly reversing the direction of rotation of an output shaft of a mechanical drive of the crank-link-crank type without reversing the direction of rotation of the prime mover.

A mechanical drive of the crank-link-crank type comprises input and output crank members connected by a link which imparts to the output crank member rotary motion derived from a positively driven input crank member. Where the radial length of the crank arms between the centers of the crank members and the respective ends of the link are identical it will be apparent that as the output crank member is rotated in one direction the link will be periodically moved into alignment with the centers of the crank members and when the link is in this position the output crank member may either be rotated in the same direction as the input member or the link may assume a crossed driving position wherein, as the input member continues to rotate, the output member is driven in the opposite direction. This "dead spot" condition arises twice during a revolution of the input member at positions 180° apart, and it is an object of the present invention to provide selectively adjustable reversing means which takes advantage of the dead spot condition to effect reversal of the rotation of an output member in a crank-link-crank drive without reversal of the input member. In addition to controlling the direction of rotation of the output member independently of the direction of rotation of the input member, the adjustable means may be positioned to prevent the output member from rotating in either direction through a complete revolution.

The direction of rotation of the output member is controlled by means of adjustable spring loading means which bear on the output member in a direction out of alignment with the centers of the input and output crank members, and which serve to supply auxiliary power to urge the output member over the dead spot in the desired direction of rotation whenever the link arrives at one of its dead spot positions. The spring loading means is rapidly adjustable between positions of mis-alignment on opposite sides of a line through the centers of the members so as to urge the output member either clockwise or counter-clockwise over the dead spot position, thus effecting reversal of the direction of rotation of the output member. In addition, the spring loading means may be adjusted to an intermediate position in alignment with the centers of the members so as to prevent the output member from passing the dead spot position in either direction, thus producing limited oscillation of the output member.

*Description of the Drawings*

FIGS. 3, 4 and 5 are views similar to FIG. 2 showing the adjusting means of the invention in various positions for effecting selectively directional rotary movement of the output member;

FIG. 6 is a partly broken side elevational view of the mechanism of FIG. 1;

Referring to FIGS. 1 and 2 of the drawings, the numeral 10 illustrates a driving motor which rotates a shaft 12, extending through an opening in a vertical support 14, continuously in a counter-clockwise direction as indicated by the arrow in FIG. 2. The shaft 12 carries a crank wheel 18 having a radially positioned crank pin 20 thereon to which there is pivotally connected one end of a link 22 the opposite end of which is pivotally connected to a crank pin 24 carried on an output crank member 26, which is generally figure-8 in shape for purposes to be described, and which is fixed to the outer end of an output shaft 28 which may extend inwardly through the support 14 and be connected to a driven member (not shown) whose direction of rotation is to be reversible in order to effect desired functions.

Figure 1:
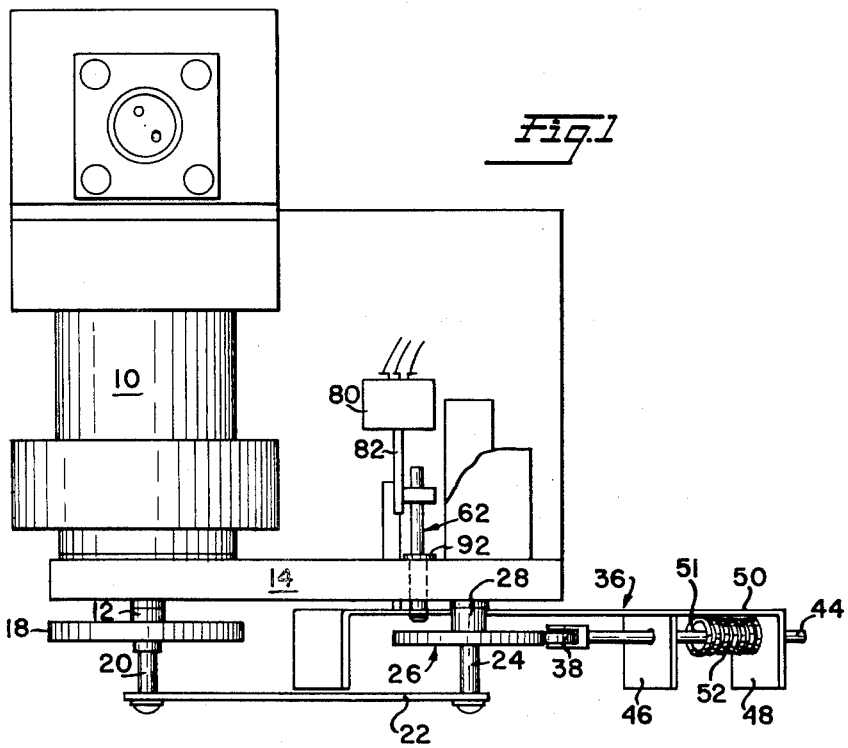
FIG. 1 is a top plan view of mechanism embodying the present invention.

The output crank member 26 must be capable of being driven through 360°, and it will therefore be apparent that the radial lengths of the crank arms between the axes or centers of rotation of the members 18, 26 and the respective crank pins 20, 24 must be identical. Therefore, when the link 22 is in either of two positions, which are indicated by the solid and phantom lines in FIG. 3, in alignment with the centers of rotation of the input and output members 18, 26, the link exerts no driving force on the output member 26 and, in these two positions, the link can be said to be in its dead spot positions. Under these conditions, continued rotation of the input member 18 in a counter-clockwise direction as shown in FIG. 1 will move its crank pin 20 out of alignment with the centers of rotation of members 18, 26 so that the link again exerts a driving force on the output member, which may be in a direction either slightly above or slightly below a line A—A passing through the centers of the two members. If the driving force of the link is exerted in a direction above the line A—A, as indicated by arrow 30, the link becomes crossed so that the driven member is rotated clockwise, whereas if the driving force is exerted in the direction of the arrow 32 the driven member 26 is rotated counter-clockwise in the same direction as the driving member 18.

The present invention provides means for controlling the direction in which the driven member 26 will be rotated while the driving member 18 is constantly rotated in the same direction, which is counter-clockwise as shown in FIG. 1. Such means comprise spring loading means, which are generally indicated by the numeral 36 and which bear on the driven member in either of two directions, both of which are out of alignment with the centers of the driving and driven members, so that the driven member is urged by auxiliary spring force across the dead spot position in the desired direction of rotation.

The spring loading means 36 comprises a cam follower 38 adapted to bear on the marginal edge of driven member 26 which, as stated hereinbefore, is shaped in the form of an 8-shaped cam having a pair of lobes 40, 42 symmetrically arranged about the center of rotation 28 of the member 26. The follower 38 is rotatably mounted on the end of a plunger 44 which is slidably received in flanges 46, 48 of a bracket member 50 which is pivotally supported on any suitable fixed bearing means coaxial with the output shaft 28. The plunger 44 carries a stop collar 51 and interposed between this collar and flange 48, which is on the outer end of bracket 50, is a compression spring 52 which exerts a force on the collar 51 to urge plunger 44 in the direction of the member 26 and cam 38 into engagement with the peripheral edge of driven member 26.

Figure 2:
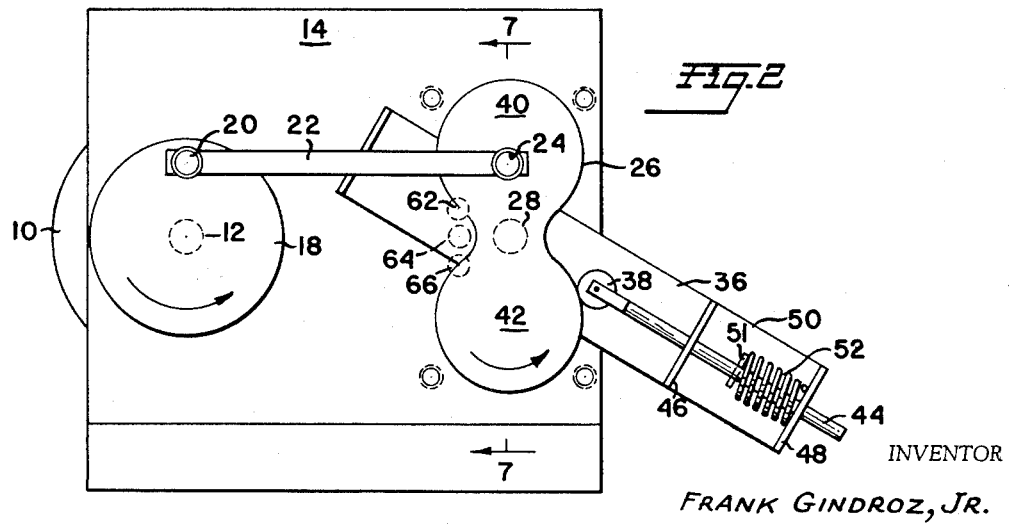
FIG. 2 is a front elevational view of the mechanism of FIG. 1.

When the bracket 50 is in the position shown in FIGS. 2 and 3, counter-clockwise movement of the driven member 26 from the position shown in FIG. 2 to that shown in FIG. 3, causes the edge or cam lobe 42 of driven member 26 to ride on the cam follower 38 to move this and the plunger 44 outwardly in bracket 50 in opposition to the force of spring 52 so that when the crank pin 24 of member 26 is moved beyond the axis of plunger 44 the compression load stored in the spring 52 will operate on the lobe 42 to urge the member 26 in its counter-clockwise direction until the link is moved into the solid line dead spot position of FIG. 3, at which point the link no longer exerts any turning force on the crank pin 24 of the driven member. Auxiliary turning force is now supplied by spring 52 through follower 38 to urge member 26 beyond the dead spot position in the desired counter-clockwise direction so that when the driving crank pin 20 is moved past the dead spot position, as indicated by the phantom lines in FIG. 3, and the link again exerts a turning force on the driven member, this force is in a direction below the line 30 through the centers of the members so that the driven member continues to rotate in the desired counter-clockwise direction.

Figure 4:
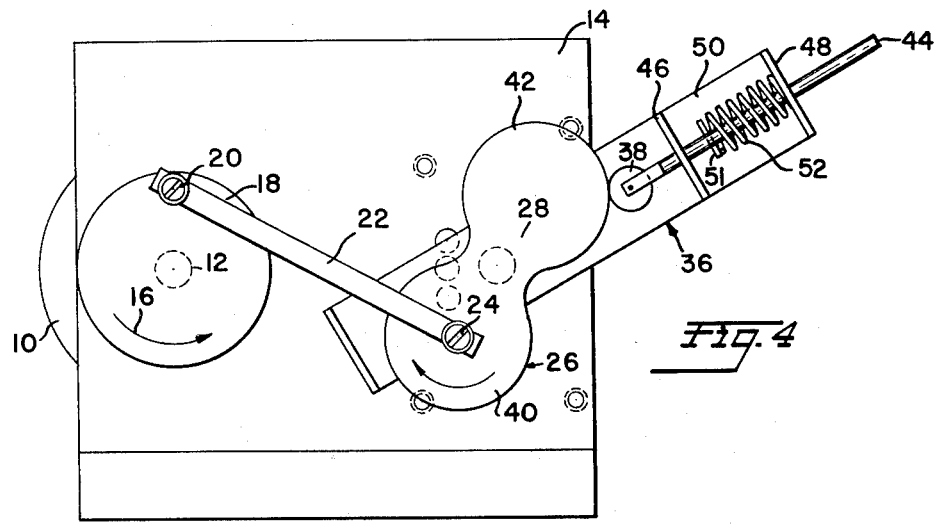

If it is now desired to reverse the direction of rotation of the output shaft 28, the bracket 50 is moved, by means hereinafter described, from the position shown in FIGS. 2 and 3 to that shown in FIG. 4. The driven member will not immediately be reversed but will continue to rotate in its original direction of rotation until the link 22 is moved into one of its dead spot positions. When this occurs the auxiliary force supplied by the previously compressed spring 52 will push the driven member 26 past the dead spot in the reverse or clockwise direction, as will be apparent in FIG. 4, so that now the direction of rotation of the member 26 and shaft 28 is reversed and will continue in a clockwise direction opposite to the rotational direction of the driving member so long as the bracket member 50 remains in the position of FIG. 4.

Figure 5:
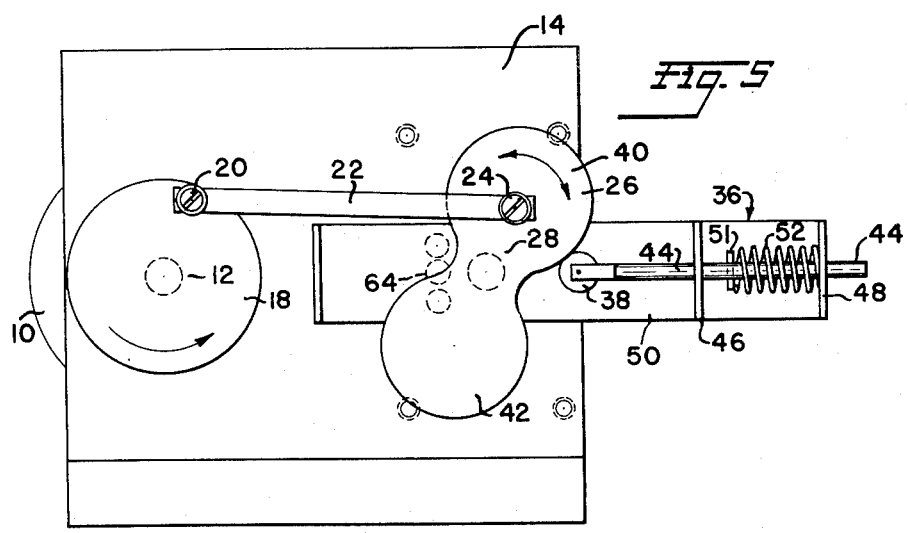

Under certain circumstances it may be desirable to prevent the output shaft 28 from rotating beyond 180° in either direction. In this event, the bracket member 50 is moved to the intermediate position shown in FIG. 5, in which the axis of the plunger 44 is in alignment with the centers of the members 18 and 26. It will be apparent that the link 22 will now rotate the member 26 counter-clockwise, as shown in FIG. 5, until the solid line dead spot of FIG. 3 is reached. Just before the link 22 and member 26 move into the dead spot position the cam follower 38 will act on the lobe 42 so as to resist rotation of the member 26 in a counter-clockwise direction. Hence, just as the link 22 enters the dead spot position so that all driving force on the crank pin 24 on member 26 is momentarily relieved, the cam follower 38 acts to push the member 26 over the dead spot in a reverse or clockwise direction with the high point of the lobe 42 never quite reaching or passing the axis of the plunger 44. As the member 26 is now rotated in a clockwise direction the cam surface of lobe 40 rides on the cam follower 38 and just before the high point of the lobe is reached, and as the link 22 enters the dotted line dead spot position of FIG. 3, the cam follower 38 acts on the member 26 to push it past the dead spot position in a counter-clockwise direction. The foregoing action is repeated for each revolution of the input member 18 with the result that the output shaft merely oscillates back and forth through a degree of movement which is just slightly less than 180°.

In accordance with the invention, means are provided for effecting movement of the reversing bracket 50 between its several positions in response to the energization of electrical control means. The bracket movement control means also controls releasable locking means which serves not only to latch the bracket in its selected position but also serves as backstop means for the driven member to prevent any inertial fly wheel effects of the driven device from causing the driven member to pass through a dead spot in its original direction of rotation after the bracket has been changed to a reversing position. It is accordingly desirable that the spring 52 be as light as possible so that excess energy, requiring a larger-than-necessary drive motor 10, will not be required merely for the compression of spring 52, and the backstop means hereinafter described permits the use of a relatively light spring while positively preventing fly wheel effects from overriding the spring upon change of position of the bracket 50.

Figure 7:
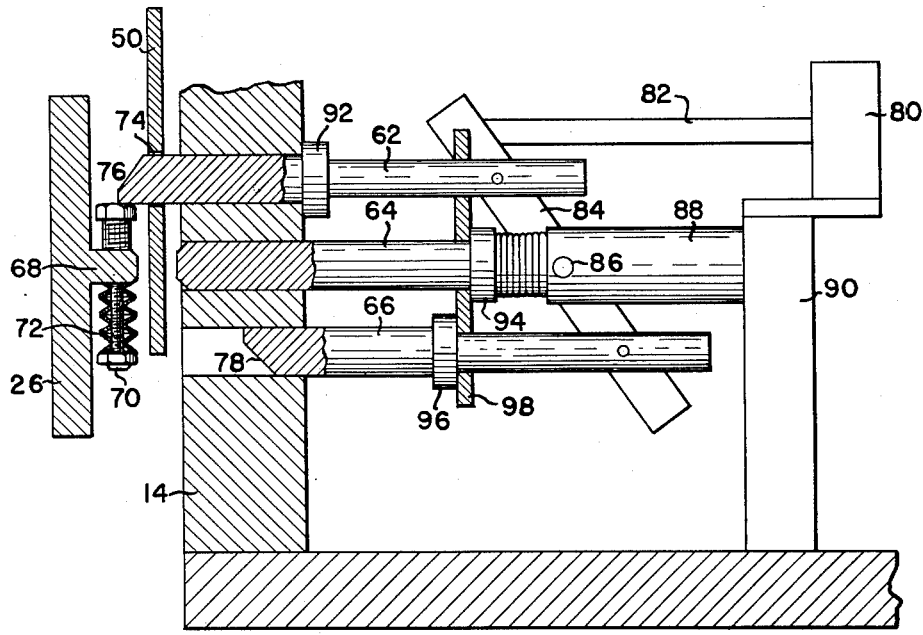
FIG. 7 is an enlarged cross sectional view taken substantially on the line 7—7 of FIG. 2.
Figure 8:
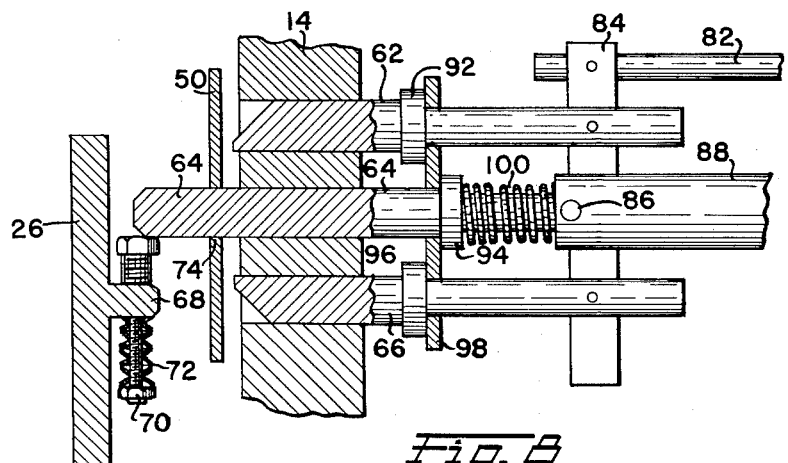
FIG. 8 is a view of parts shown in FIG. 7 but in changed position.

With reference now to FIGS. 7 and 8, the combined bracket-positioning and backstop means comprising three plungers 62, 64, 66 which are adapted to operate through openings in the support member 14. Integral with the back of driven member 26 is a boss 68 which is centrally drilled to slidably receive a bolt 70 which is normally centered with respect to the boss 68 by cushioning springs, such as Belleville springs 72, which surround bolt 70 above and below boss 68. The bracket member 50 is provided with an aperture 74 which, in its three different positions, is adapted to register with one of the plungers so that when a plunger is extended it is received in the aperture to lock the bracket 50 in any of its three positions. Each of the plungers has sufficient length to extend beyond the aperture 74 into the path of movement of the bolt 70 and, when extended, the plungers are resiliently loaded in their extended position with the upper and lower plungers 62, 66 being beveled in opposite directions, as indicated at 76 and 78, so that when one of these plungers, say plunger 62, is extended the stop bolt may ratchet past the plunger when moving in one direction, but is positively prevented by the flat undersurface of the plunger from moving in the opposite direction. Thus, when plunger 62 is extended the driven member 26 may rotate only in a counter-clockwise direction and vice versa when the plunger 66 is extended.

The plungers, and hence the positioning of the bracket 50, are preferably controlled through the action of a three position solenoid 80 which may be energized by switch means (not shown) corresponding to the three positions of the bracket 50. The solenoid 80 positions a plunger 82 which is connected to a lever 84 having pivotal connections with the plungers 62, 66 and mounted on a central pivot 86 which may extend from one side of a hollow sleeve 88 fixed to a vertical support member 90. The plungers 62, 64, 66 may be provided with collars 92, 94, 96 and when the lever 84 is in the position shown in FIG. 7 the collar 92 serves as a limit stop for the plunger 62 while the collar 96 of the plunger 66 serves to engage an apertured plate 98 to move this into abutment with the collar 94 of the central plunger 64 to retain this in its retracted position. When the plunger 82 of the solenoid 80 is retracted to rock the lever 84 in the opposite direction the collar 92 engages the plate 98 to retain the central plunger 64 retracted while the lower plunger 66 is moved towards its extended position.

It will be apparent from FIG. 7 that when the upper plunger 62 is retracted and the lower plunger 66 is moved towards its extended position, the latter will not be able to move to its fully extended position because of the fact that the lower edge part of the bracket member 50 intervenes, so that the plunger 66 merely moves until the forward end thereof abuts the rear surface of the bracket. Meanwhile, because the upper plunger 62 has been withdrawn from the aperture 74, the bracket 50 is now free to rotate from the position of FIG. 2 to the position of FIG. 4. Automatic rotation of the bracket 50 from the position of FIG. 2 to the position of FIG. 4 is achieved when one of the lobes of driven member 26, for example lobe 42, operates on the cam follower 38 to exert rotary counter-clockwise force on the bracket 50 so that the latter is moved by the lobe until the aperture 74 moves into registry with the plunger 66 whereupon the latter snaps into the aperture 74 and extends beyond it into the path of movement of the backstop bolt 70 on the rear of the driven member 26. Obviously, when the plungers are moved back to the position of FIG. 7 the reverse process takes place and the appropriate lobe of the driven member operates on the cam follower to move the bracket 50 back to the position of FIG. 7.

When it is desired to prevent full rotation of the output shaft 28, the solenoid 80 is operated to move the plunger 82 to an intermediate position, whereupon the lever 84 is positioned vertically as shown in FIG. 8. Upon this occurrence the plungers 62, 66 are both retracted so that they are just clear of the control bracket 50, which position permits movement of the plate 98 in the direction of the support 14 through the action of a spring 100 which bears on the collar 94 of the central plunger 64. The latter is therefore extended through its opening in support 14 into abutment with the rear of the bracket 50 and, as this is moved, for example in a clockwise direction, from the position of FIG. 7 by engagement of one of the lobes 40, 42 with the cam follower 38, as above explained, the opening 74 is moved into registry with the plunger 64 so that the latter snaps therethrough to the position shown in FIG. 8. When so positioned, the plunger 64 serves both as a positioning latch for the bracket 50 and as a positive stop means in the path of the bolt 70 on the back of the member 26 so as to prevent the latter from passing through a dead spot in either direction.

The operation of the invention will be apparent from the foregoing description. It will be understood that the invention provides novel means for rapidly reversing the direction of an output shaft without reversing the driving member, by utilizing a crank-link-crank drive and changing the direction of an applied auxiliary force to drive the driven member in the desired direction through dead spots. In addition, the invention provides novel control means for effecting change in the direction of application of the auxiliary force and includes means for positively preventing continued rotation of the driven member in the wrong direction upon change of the reversing means. Another feature of the device according to the invention is its ability to stop operation of the ultimate device driven by the mechanism without requiring stopping of the primary driving member.

It should be understood that the reversing, spring loading means shown and described is a preferred embodiment only and is susceptible of various changes. For example, reversible resilient loading means might be provided which operate directly on the driven member's crank pin or on the adjacent end of the link. Additionally, when it is desired to stop operation of the ultimate driven device without stopping the prime mover, the driven or output shaft may be connected to the device through a conventional lost motion connection which would permit the output shaft to oscillate without imparting any motion to the device.

What is claimed is:

1. A drive for transmitting rotary movement of a prime mover to an output shaft comprising first and second crank arms of equal radial length drivingly connected respectively to said prime mover and to said output shaft, a link interconnecting the radial outer ends of said crank arms whereby rotary movement of said first crank arm is transmitted to the second crank arm except when said link is positioned in a dead spot in alignment with the centers of rotation of said crank arms, and resilient means for exerting an auxiliary rotary force on said second crank arm when said link is in a dead spot position so as to drive said second crank arm through said dead spot independently of the movement of said first crank arm, said resilient means being adapted to exert its auxiliary rotary force on said second crank arm in a rotational direction opposite to the movement of said first crank arm whereby said second crank arm is continuously rotated oppositely to said first crank arm.

2. The drive of claim 1 including means for shifting the direction of effort of said resilient means so that it exerts its auxiliary rotary force on said second crank arm in the same rotational direction as said first crank arm whereby said second arm is continuously rotated in the same direction as said first arm.

3. A reversible drive for transmitting rotary movement of a prime mover to an output shaft and effecting reversal of said shaft without reversal of the prime mover comprising first and second crank arms of equal radial length drivingly connected respectively to said prime mover and to said output shaft, a link interconnecting the radial outer ends of said crank arms whereby rotary movement of said first crank arm is transmitted to the second crank arm except when said link is positioned in a dead spot in alignment with the centers of rotation of said crank arms, resilient means for exerting an auxiliary rotary force on said second crank arm when said link is in a dead spot position so as to drive said second crank arm through said dead spot independently of the movement of said first crank arm, and means for selectively shifting the direction of effort of said resilient means so that it exerts its auxiliary rotary force on said second crank arm either in the same or in the opposite rotational sense with respect to said first crank arm whereby said second crank arm is continuously rotated in one direction or the other depending upon the position of said selective shifting means.

4. The reversible drive of claim 3 including additional means for selectively shifting the direction of effort of said resilient means so that upon each arrival of said second crank arm at a dead spot position the resilient means exerts an opposite rotational force on said second crank arm whereby said arm is prevented from passing through a dead spot position in either direction.

5. A reversible drive for transmitting rotary movement of a prime mover to an output shaft and effecting reversal of said shaft without reversal of the prime mover comprising first and second crank arms of equal radial length drivingly connected respectively to said prime mover and to said output shaft, a link interconnecting the radial outer ends of said crank arms whereby rotary movement of said first crank arm is transmitted to the second crank arm except when said link is positioned in a dead spot in alignment with the centers of rotation of said crank arms, symmetrical cam means connected to said second crank arm for rotation therewith, a cam follower resiliently urged into camming engagement with said cam means, shiftable means for selectively positioning said cam follower on opposite sides of a line through the rotational centers of said crank arms so that said follower exerts an auxiliary rotary force on said cam means out of alignment with the rotational centers of said crank arms whenever said link is in a dead spot position whereby said cam follower drives said cam and said crank arm through said dead spot independently of said first crank arm in one direction or the other depending on the selected position of said cam follower.

6. The reversible drive of claim 5 wherein said shiftable means is also adapted for selective positioning of said cam follower in alignment with the centers of rotation of said crank arms so as to oppose movement of said cam means through a dead spot in both directions of rotation of said second crank arm.

7. The reversible drive of claim 6 wherein said shiftable means comprises rockable bracket means pivotally mounted coaxial with the center of rotation of said second crank arm and includes means movably mounting said cam follower on said bracket means and resilient means carried by said bracket and operating on said cam follower to urge the same at all times into engagement with said cam means.

8. The reversible drive of claim 7 including releasable locking means engageable with said bracket means for retaining the same in a selected position, means for releasing said locking means so as to enable said cam means to engage said cam follower for shifting said bracket means from its initial position to a second position in the direction of rotation of said second crank arm, and means for re-engaging said locking means with said bracket means for retaining the same in its second position.

9. The reversible drive of claim 8 wherein said releasable locking means comprises a plurality of independently extensible and retractable plungers and includes an aperture in said bracket means for receiving said respective plungers when said bracket means is moved to any of its selective positions.

10. The reversible drive of claim 9 wherein said plungers are constructed and arranged to extend through said aperture in said bracket means into the path of movement of a part connected with said second crank arm, the plungers for locking said bracket means in positions wherein said cam follower is mis-aligned with the centers of said crank arms having ratchet surfaces enabling the part connected to said crank arm to be rotated in a selected direction while preventing rotation in the opposite direction, the plunger for locking said bracket means in a position wherein said cam follower is in alignment with the centers of said crank arm having stop surfaces for preventing the rotation of said second crank arm beyond a dead spot in either of its directions of rotation.

11. The reversible drive of claim 3, including shiftable stop means for positively preventing rotation of said output shaft in a direction other than the selected direction, and means cooperating with said shifting means for shifting said stop means so that it acts in the selected direction as determined by the position of said shifting means.

12. The reversible drive of claim 11 wherein said shiftable stop means is of the one way ratchet type.

13. The reversible drive of claim 4, including shiftable stop means for positively preventing rotation of said output shaft in a direction other than the selected direction or for positively preventing rotation of said output shaft through 180° in either direction, and means cooperating with said shifting means for shifting said stop means so that it acts either in the selected direction or to prevent rotation in either direction as determined by the position of said shifting means.

References Cited in the file of this patent

UNITED STATES PATENTS

| | | |
|---|---|---|
| 69,929 | Niebergall | Oct. 15, 1867 |
| 93,004 | Read | July 27, 1869 |
| 115,073 | Lull | May 23, 1871 |
| 517,264 | Currey | Mar. 27, 1894 |

FOREIGN PATENTS

| | | |
|---|---|---|
| 531,837 | France | Nov. 2, 1921 |